United States Patent
Huang

(10) Patent No.: US 9,604,395 B2
(45) Date of Patent: Mar. 28, 2017

(54) AUTOMATIC OPENING AND CLOSING DEVICE FOR A MOLD ASSEMBLY

(71) Applicant: TIEN KANG CO., LTD., Taichung (TW)

(72) Inventor: David Huang, Taichung (TW)

(73) Assignee: Tien Kang Co., Ltd., Taichung (TW)

( * ) Notice: Subject to any disclaimer, the term of this patent is extended or adjusted under 35 U.S.C. 154(b) by 129 days.

(21) Appl. No.: 14/801,497

(22) Filed: Jul. 16, 2015

(65) Prior Publication Data

US 2017/0015037 A1 Jan. 19, 2017

(51) Int. Cl.
*B29C 45/67* (2006.01)
*B29C 45/64* (2006.01)
*B29C 45/04* (2006.01)

(52) U.S. Cl.
CPC .............. *B29C 45/67* (2013.01); *B29C 45/64* (2013.01); *B29C 45/641* (2013.01); *B29C 2045/0425* (2013.01)

(58) Field of Classification Search
CPC ....... B29C 45/64; B29C 45/641; B29C 45/67; B29C 2045/0425; B29C 2045/0483
See application file for complete search history.

(56) References Cited

U.S. PATENT DOCUMENTS 6,280,178 B1 * 8/2001 Khan .................. B29C 45/0441
425/409
6,638,046 B1 * 10/2003 Gillen .................... B29C 33/20
425/117

\* cited by examiner

*Primary Examiner* — James Mackey
(74) *Attorney, Agent, or Firm* — Wang Law Firm, Inc.

(57) ABSTRACT

An automatic opening and closing device for a mold assembly includes a base, a pivot seat, a first extensible unit, an upper mold mounting unit, two shafts, a second extensible unit, a left arm and a right arm. The first extensible unit can move the upper mold mounting unit downward to clamp or release the mold, and the second extensible unit is used to move the pivot seat between two positions. When the pivot seat is in a first position, the upper mold mounting unit can be lowered down to secure or release the mold by the first extensible unit, when in the second position, the upper mold mounting unit and the mold can be rotated an angle, to perform opening or closing of the mold assembly.

4 Claims, 8 Drawing Sheets

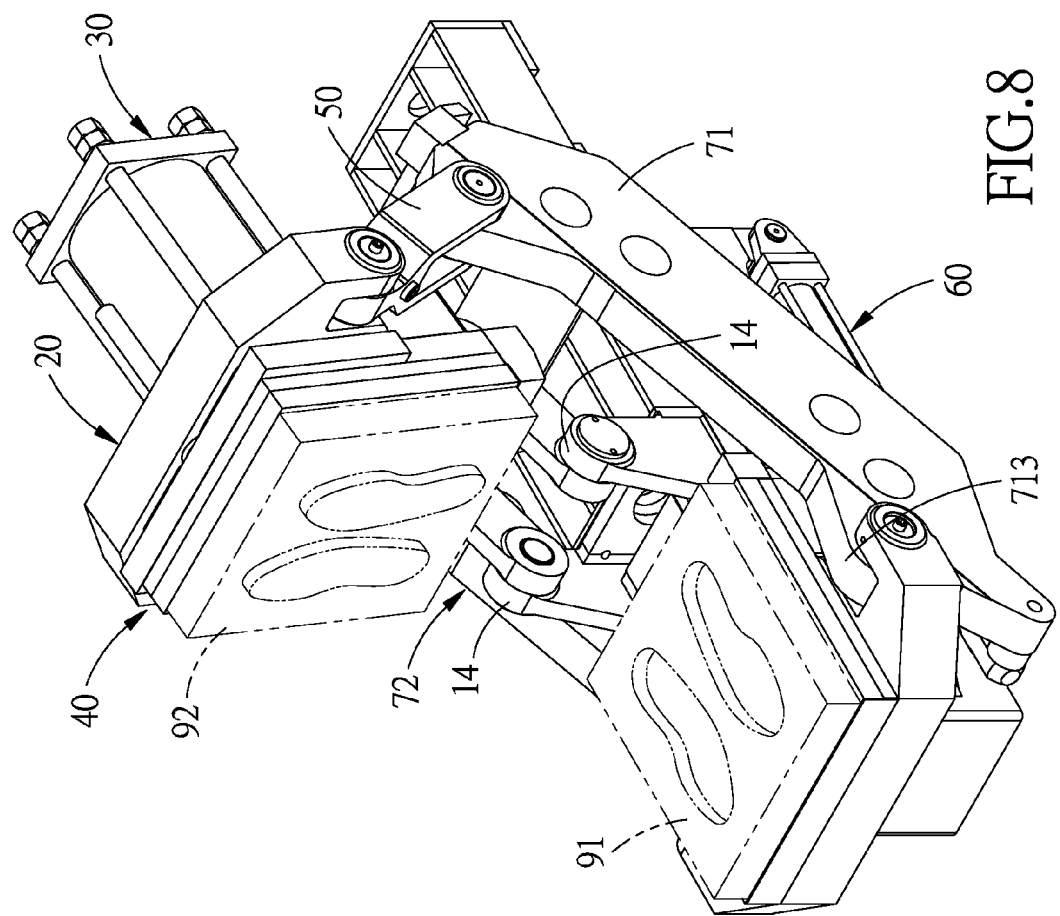

US 9,604,395 B2

AUTOMATIC OPENING AND CLOSING DEVICE FOR A MOLD ASSEMBLY

BACKGROUND OF THE INVENTION

Field of the Invention

The present invention relates to a mold assembly, and more particularly to an automatic opening and closing device for a mold assembly.

Description of the Prior Art

Injection molding machines have been widely used in various fields, including household industry, electronic, electric appliances, automobile, and motorcycle components. The existing injection molding machines are generally categorized into vertical type and horizontal type based on the direction of plastic injection.

As for the vertical injection molding machine, the injection unit and the molds are vertically disposed on a base, plastic is injected in the vertical direction by the injection unit, and all vertical injection molding machines are provided with a mold assembly to perform injection molding. However, in order to improve injection molding efficiency, automation is a must-have technique, especially, for automatic opening and closing of the mold assembly.

The present invention has arisen to mitigate and/or obviate the afore-described disadvantages.

SUMMARY OF THE INVENTION

The primary objective of the present invention is aimed at providing an automatic opening and closing device for a mold assembly, which is capable of automatically closing and opening the mold assembly, so as to improve injection molding efficiency.

Therefore, an automatic opening and closing device for a mold assembly in accordance with the present invention includes: a base including a base portion for mounting of a lower mold, two first fixing portions disposed at two sides of the base portion, a second fixing portion which is located lower than the first fixing portions and disposed at one side of the base portion, and two third fixing portions which are located higher than the base portion and disposed between the two first fixing portions and the second fixing portion, the first fixing portions being located at one end of the base portion, and the second fixing portion is located at another end of the base portion; a pivot seat pivotally mounted on the base and pivotable between a first position and a second position, and including a seat portion, two pivot portions at two sides of the seat portion, and two pivot arms extending from the seat portion and pivoted to the third fixing portions; a first extensible unit including a first extensible member fixed at a top surface of the seat portion of the pivot seat, and a first extensible rod which is inserted through the seat portion and telescopically into the first extensible member; an upper mold mounting unit located below the seat portion and fixed to the first extensible rod to secure or release an upper mold; two shafts each including a first shaft portion and a second shaft portion which are pivoted to the pivot portions of the pivot seat; a second extensible unit including a second extensible body fixed to one of the second fixing portions, and a second extensible rod which includes a rod portion and telescopically inserted into the second extensible body; a left arm including a left pivot portion pivoted to the rod portion of the second extensible rod, a first left pivot portion pivoted to the second shaft portion of one of the two shafts, and a second left pivot portion pivoted to one of the first fixing portions of base and located between the left pivot portion and the first left pivot portion; and a right arm including a first right pivot portion pivoted to the second shaft portion of another of the two shafts, and a second right pivot portion pivoted to another one of the first fixing portions of the base.

Preferably, the upper mold mounting unit includes two restricting grooves for accommodation of the two pivot arms of the pivot seat.

Preferably, the first extensible unit is a hydraulic cylinder.

Preferably, the second extensible unit is a hydraulic cylinder.

BRIEF DESCRIPTION OF THE DRAWINGS

FIG. 8 is a perspective view of the present invention, showing that the pressure cylinder extends out to move the pivot seat to the second position.

DETAILED DESCRIPTION OF THE PREFERRED EMBODIMENTS

Figure 1:
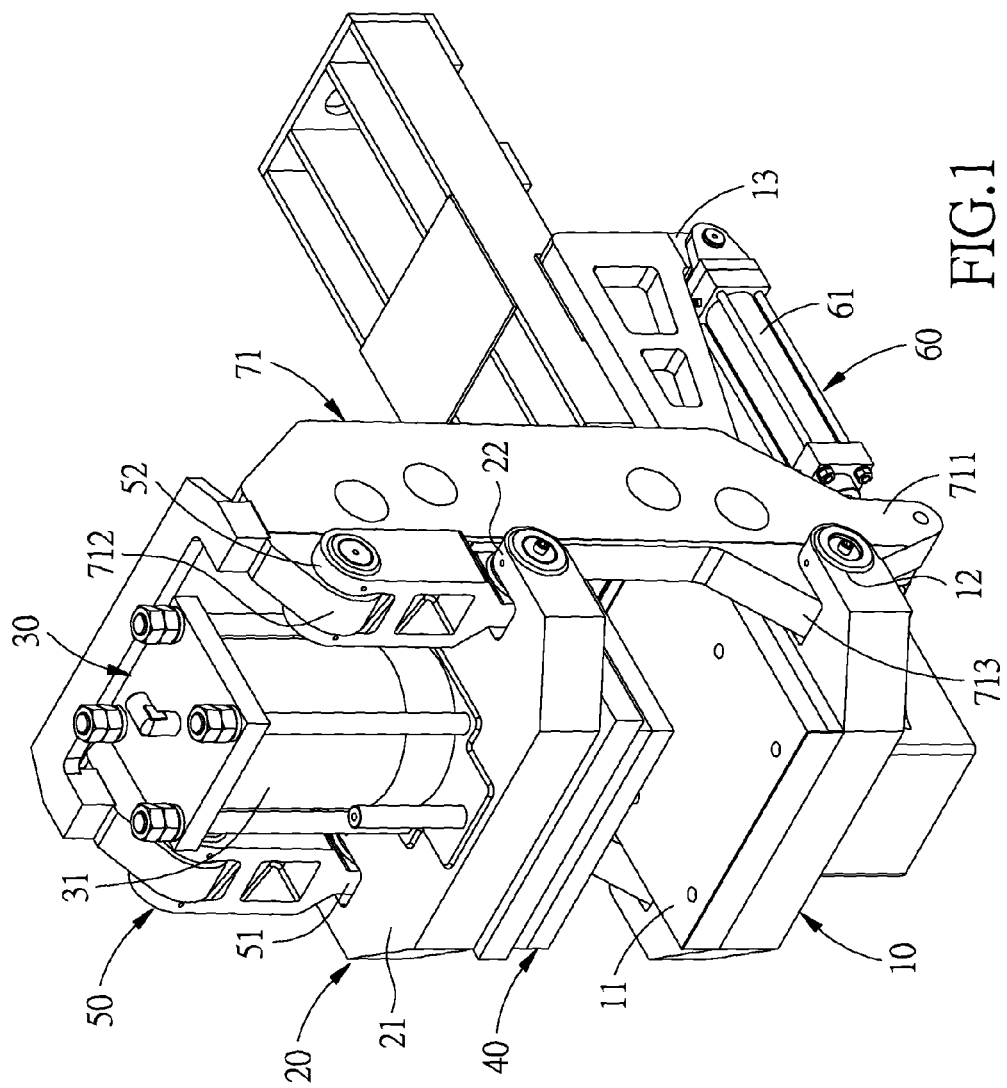
FIG. 1 is a perspective view of an automatic opening and closing device for a mold assembly in accordance with the present invention.
Figure 2:
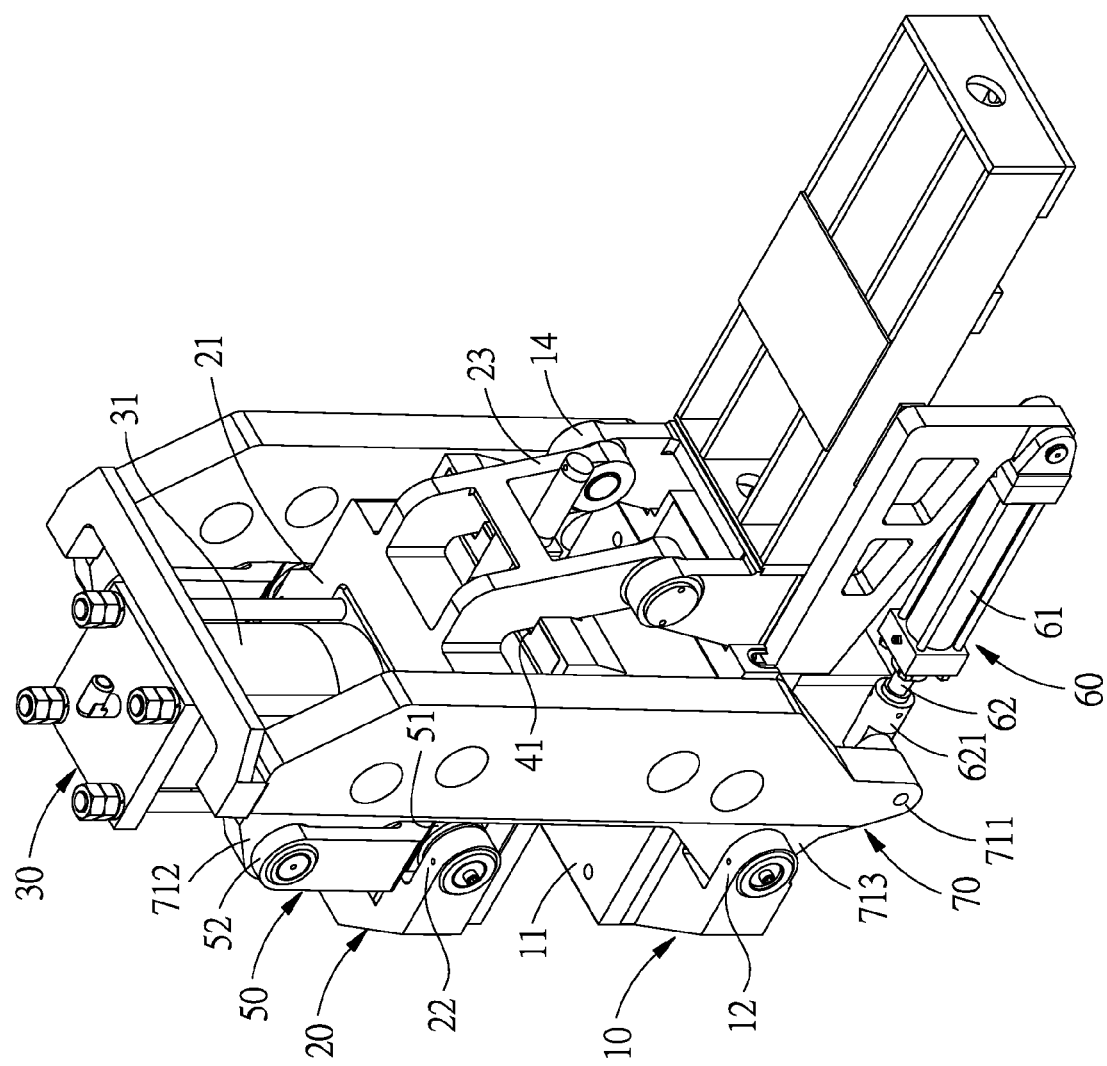
FIG. 2 is a second perspective view of the automatic opening and closing device for a mold assembly in accordance with the present invention.
Figure 3:
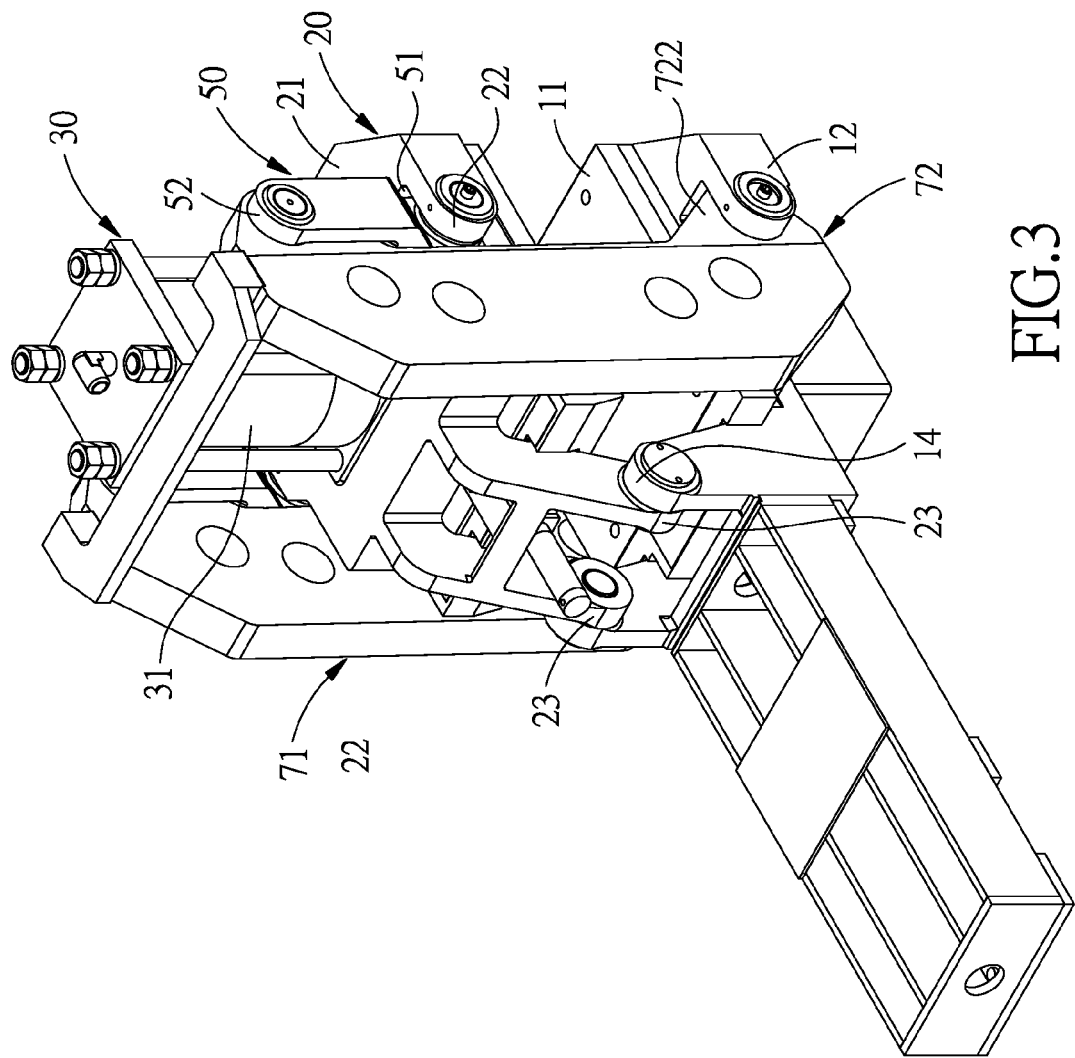
FIG. 3 is a third perspective view of the automatic opening and closing device for a mold assembly in accordance with the present invention.

The present invention will be clearer from the following description when viewed together with the accompanying drawings, which show, for purpose of illustrations only, the preferred embodiment in accordance with the present invention.

Referring to FIGS. 1-4, an automatic opening and closing device for a mold assembly in accordance with the present invention includes: a base 10, a pivot seat 20, a first extensible unit 30, an upper mold mounting unit 40, two shafts 50, a second extensible unit 60, a left arm 71 and a right arm 72.

The base 10 includes a base portion 11 for mounting of a lower mold 91, two first fixing portions 12 disposed at two sides of the base portion 11, a second fixing portion 13 which is located lower than the first fixing portions 12 and disposed at one side of the base portion 11, and two third fixing portions 14 which are located higher than the base portion 11 and disposed between the two first fixing portions 12 and the second fixing portion 13. The first fixing portions 12 are located at one end of the base portion 11, and the second fixing portion 13 is located at another end of the base portion 11. In this embodiment, the third fixing portions 14 are located adjacent to the base portion 11.

The pivot seat 20 is pivotally mounted on the base 10 to be moved between a first position (as shown in FIG. 1) and a second position (as shown in FIG. 8). The pivot seat 20 includes a seat portion 21, two pivot portions 22 at two sides of the seat portion 21, and two pivot arms 23 extending from the seat portion 21 and pivoted to the third fixing portions 14. In this embodiment, when the pivot seat 20 is moved to the first position, the seat portion 21 is located above the base portion 11 of the base 10, and when moving to the second position from the first position, the pivot seat 20 is rotated clockwise an angle around the third fixing portions 14.

Figure 5:
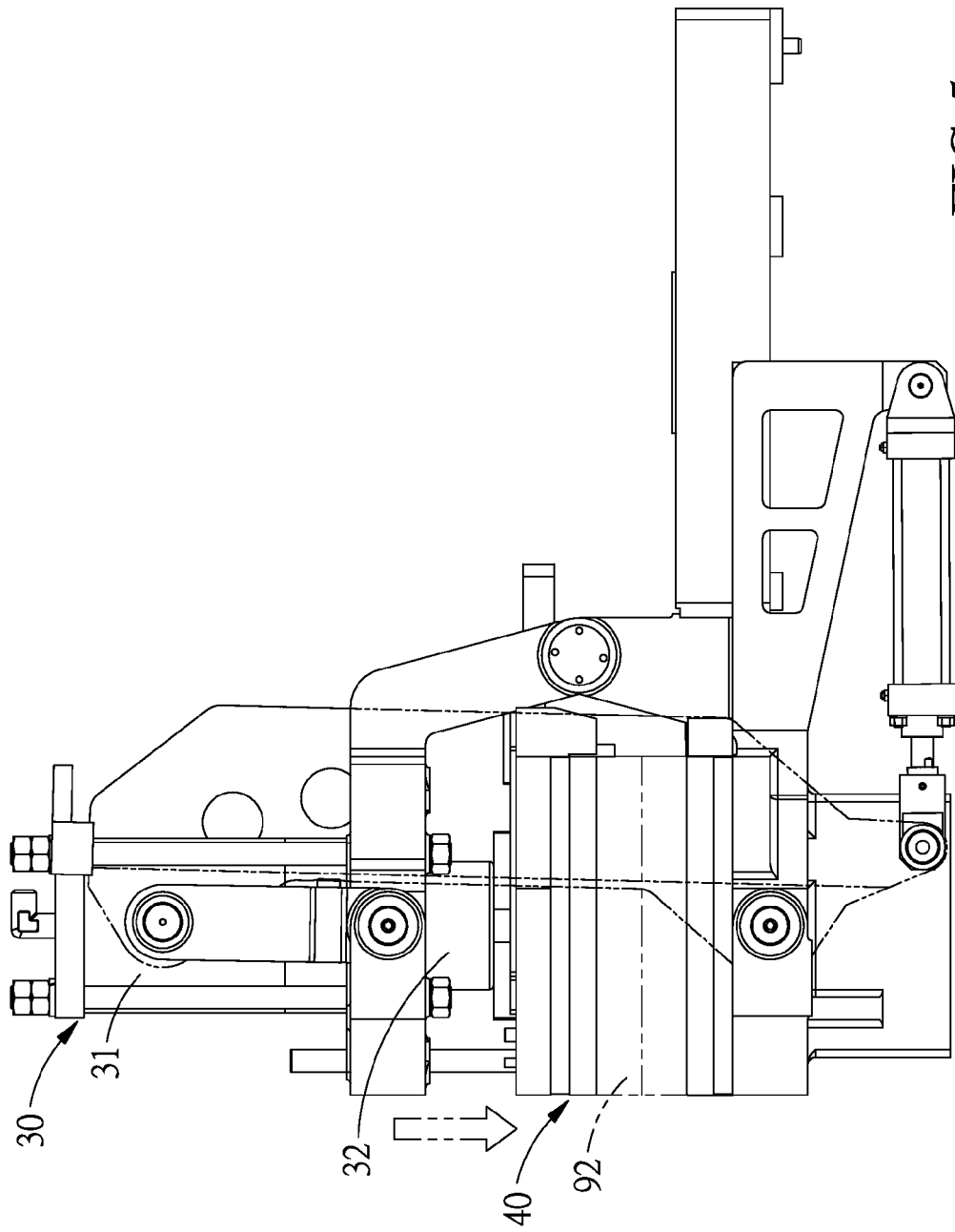
FIG. 5 is an operational view of the present invention, showing that the pivot seat is in a first position where the upper mold mounting unit is lowered down to clamp the upper mold.

The first extensible unit 30 includes a first extensible member 31 fixed at the top surface of the seat portion 21 of the pivot seat 20, and a first extensible rod 32 (as shown in FIG. 5) which passes through the seat portion 21 and disposed to the first extensible member 31 for telescoping. The first extensible unit 30 is preferably, but not limited to, a hydraulic cylinder.

The upper mold mounting unit 40 is located below the seat portion 21 and fixed to the first extensible rod 32 to secure or release an upper mold 92. In this embodiment, the upper mold mounting unit 40 includes two restricting grooves 41 for accommodation of the two pivot arms 23 of the pivot seat 20.

The two shafts 50 each includes a first shaft portion 51 and a second shaft portion 52 which are pivoted to the pivot portions 22 of the pivot seat 20.

The second extensible unit 60 includes a second extensible body 61 fixed to one of the second fixing portions 13, and a second extensible rod 62 which includes a rod portion 621 and disposed to the second extensible body 61 for telescoping. The second extensible unit 60 is, but not limited to a hydraulic cylinder.

The left arm 71 includes a left pivot portion 711 pivoted to the rod portion 621 of the second extensible rod 62, a first left pivot portion 712 pivoted to the second shaft portion 52 of one of the two shafts 50, and a second left pivot portion 713 pivoted to one of the first fixing portions 12 of base 10 and located between the left pivot portion 711 and the first left pivot portion 712.

The right arm 72 includes a first right pivot portion 721 pivoted to the second shaft portion 52 of another one of the two shafts 50, and a second right pivot portion 722 pivoted to another one of the first fixing portions 12 of the base 10.

Figure 4:
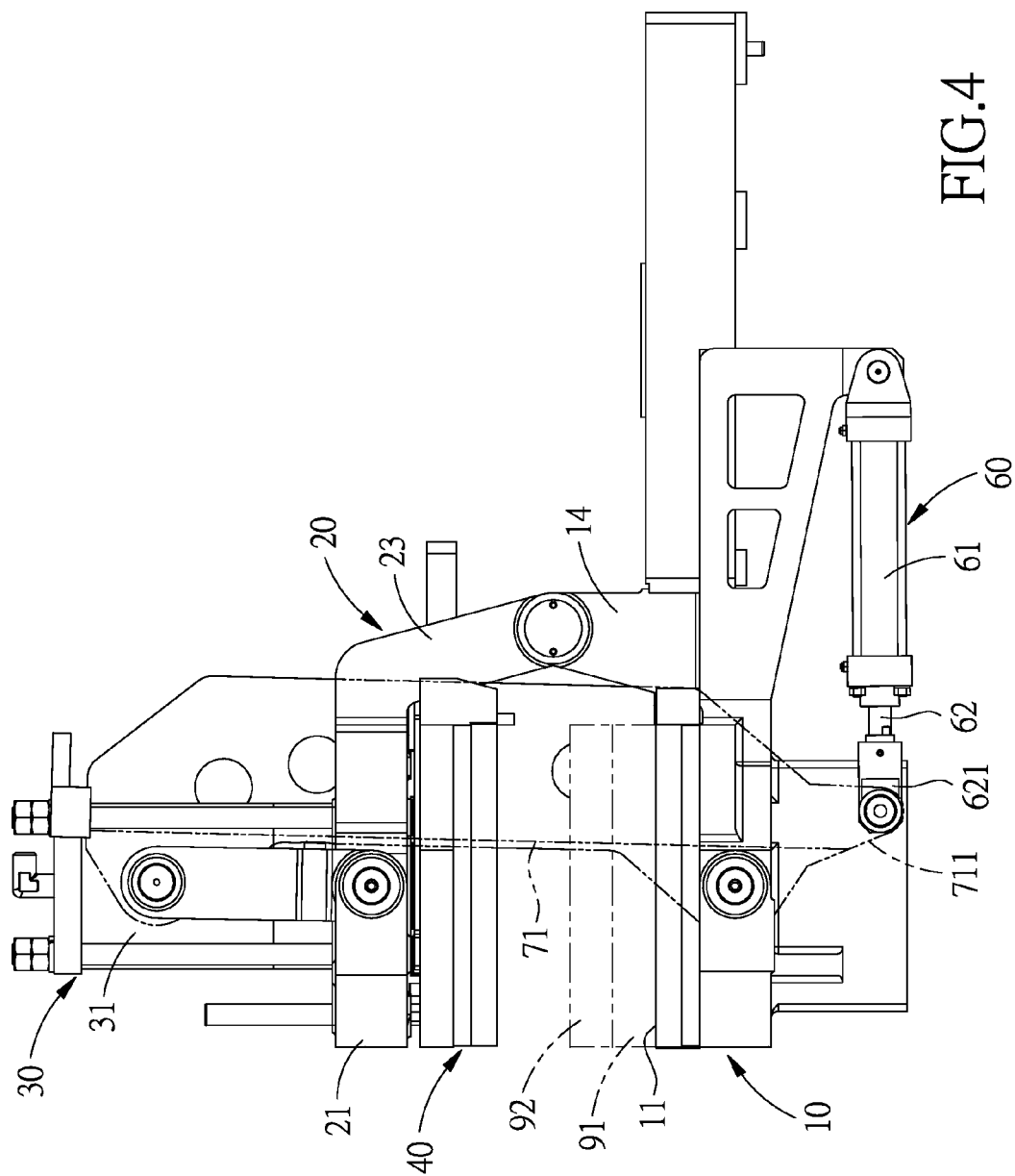
FIG. 4 is a side view of the automatic opening and closing device for a mold assembly in accordance with the present invention.

Referring then to FIG. 4, while the pivot seat 20 is at the first position, the lower mold 91 is connected to the base portion 11 of the base 10, and the upper mold 92 is connected to the lower mold 91, the seat portion 21 is located above the base portion 11. As shown in FIG. 5, then the first extensible rod 32 of the first extensible unit 30 is extended downward to move the upper mold mounting unit 40 to a position above the upper mold 92, then the upper mold mounting unit 40 is able to clamp the upper mold 92.

Figure 6:
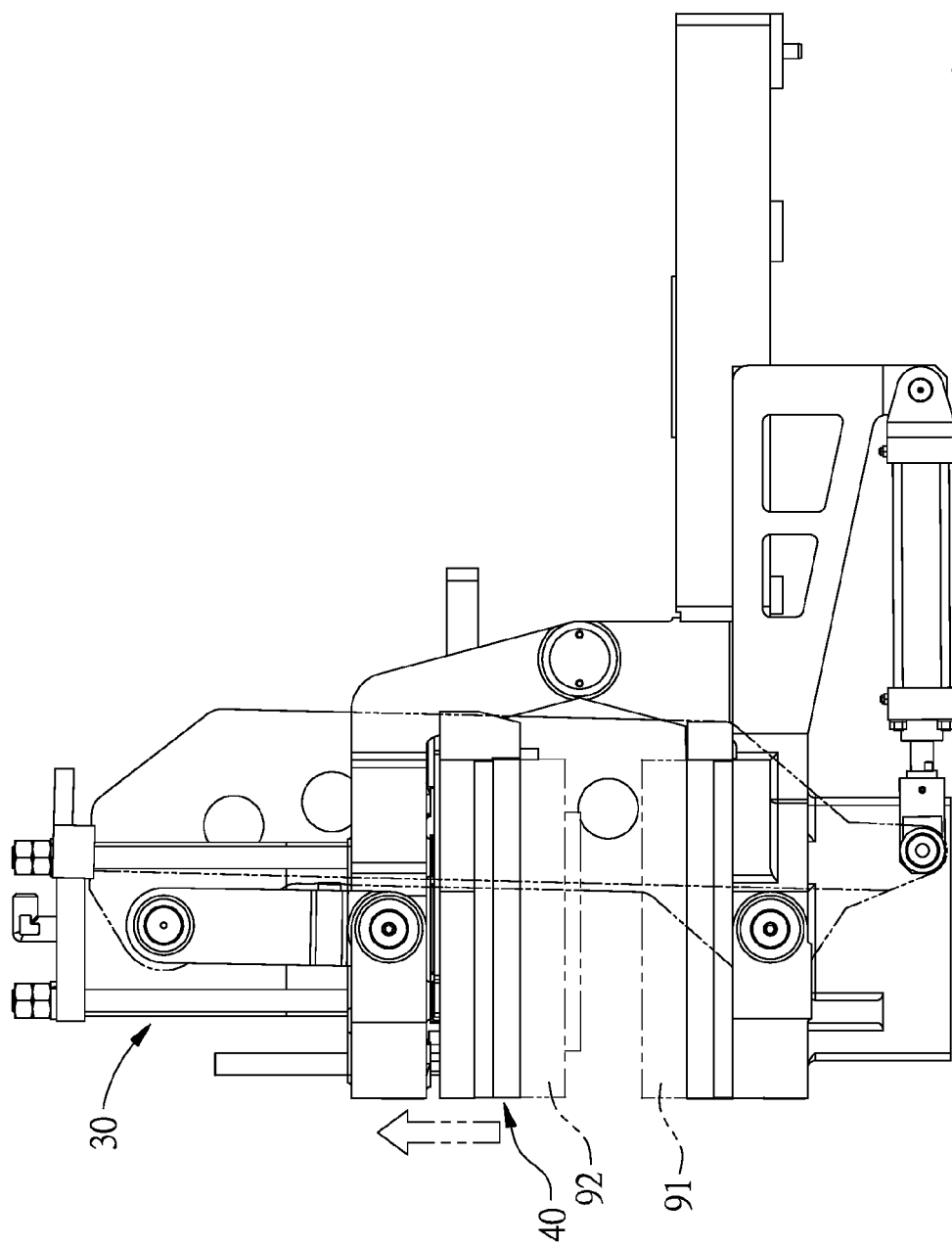
FIG. 6 is an operational view of the present invention, showing that the pivot seat is in a first position where the upper mold mounting unit clamps the upper mold and moves upward.
Figure 7:
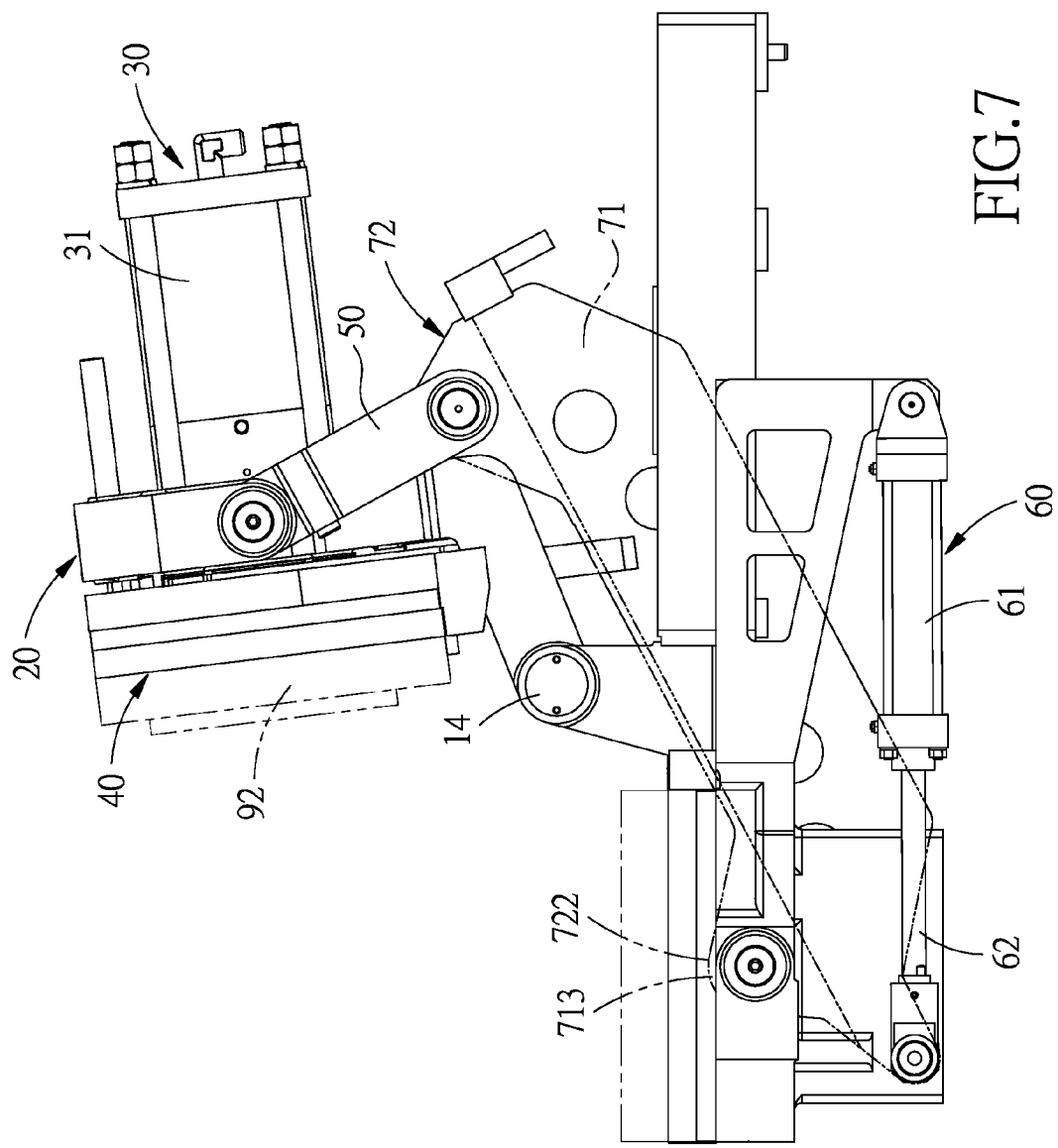
FIG. 7 is an operational view of the present invention, showing that the pressure cylinder extends out to move the pivot seat to the second position.

Referring then to FIGS. 5 and 6, the first extensible rod 32 is retracted to pull the upper mold mounting unit 40 and the upper mold 92 clamped by the upper mold mounting unit 40 away from the lower mold 91, so that the mold assembly is opened. Referring then to FIGS. 7 and 8, the second extensible rod 62 of the second extensible unit 60 is extended to make the left and the right arms 71, 72 rotate counterclockwise (the direction is defined based on FIG. 7) for an angle around the second left and right pivot portions 713, 722. Due to the shafts 50 are pivoted between the left and right arms 71, 72 and the pivot seat 20, the pivot seat 20 will also rotate counterclockwise for an angle around the third fixing portions 14, as a result, the first extensible unit 30, the upper mold mounting unit 40 and the upper mold 92 which are disposed on the pivot seat 20 will also rotate counterclockwise for an angle around the third fixing portions 14, and thus opening of the mold assembly is finished.

With the base 10, the pivot seat 20, the upper mold mounting unit 40, the shafts 50, the left and right arms 71, 72, and the first and second extensible units 30, 60, the present invention is capable of automatically opening a mold assembly. Closing of the mold assembly can be achieved by conducting the above steps in a reverse manner.

While we have shown and described various embodiments in accordance with the present invention, it is clear to those skilled in the art that further embodiments may be made without departing from the scope of the present invention.

What is claimed is:

1. An automatic opening and closing device for a mold assembly comprising:
   a base including a base portion for mounting of a lower mold, two first fixing portions disposed at two sides of the base portion, a second fixing portion disposed at one side of the base portion, and two third fixing portions disposed between the two first fixing portions and the second fixing portion, wherein the second fixing portion is lower than the first fixing portions; the third fixing portions are higher than the base portion; the first fixing portions are located at one end of the base portion, and the second fixing portion is located at another end of the base portion;
   a pivot seat pivotally mounted on the base to be moved between a first position and a second position, and including a seat portion, two pivot portions at two sides of the seat portion, and two pivot arms extending from the seat portion and pivoted to the third fixing portions;
   a first extensible unit including a first extensible member fixed at a top surface of the seat portion of the pivot seat, and a first extensible rod passing through the seat portion and disposed at the first extensible member for telescoping;
   an upper mold mounting unit located below the seat portion and fixed to the first extensible rod to secure or release an upper mold;
   two shafts each including a first shaft portion and a second shaft portion which are pivoted to the pivot portions of the pivot seat;
   a second extensible unit including a second extensible body fixed to one of the second fixing portions, and a second extensible rod which includes a rod portion disposed to the second extensible body for telescoping;
   a left arm including a left pivot portion pivoted to the rod portion of the second extensible rod, a first left pivot portion pivoted to the second shaft portion of one of the shafts, and a second left pivot portion pivoted to one of the first fixing portions of base and located between the left pivot portion and the first left pivot portion; and
   a right arm including a first right pivot portion pivoted to the second shaft portion of another one of the shafts, and a second right pivot portion pivoted to another one of the first fixing portions of the base.

2. The automatic opening and closing device as claimed in claim 1, wherein the upper mold mounting unit includes two restricting grooves for accommodation of the two pivot arms of the pivot seat.

3. The automatic opening and closing device as claimed in claim 1, wherein the first extensible unit is a hydraulic cylinder.

4. The automatic opening and closing device as claimed in claim 1, wherein the second extensible unit is a hydraulic cylinder.

\* \* \* \* \*